J. L. Baldwin,
Clevis.

No. 92,775.  Patented Jul. 20. 1869.

UNITED STATES PATENT OFFICE.

JAMES L. BALDWIN, OF TROY, PENNSYLVANIA.

IMPROVEMENT IN PLOW-BEAM-CLEVIS ATTACHMENTS.

Specification forming part of Letters Patent No. 92,775, dated July 20, 1869.

*To all whom it may concern:*

Be it known that I, JAMES L. BALDWIN, of Troy, in the county of Bradford and State of Pennsylvania, have invented a new and useful Improvement in Plow-Beams; and I do hereby declare that the following is a full, clear, and exact description thereof, which will enable others skilled in the art to make and use the same, reference being had to the accompanying drawings, forming part of this specification, in which—

Figure 1:
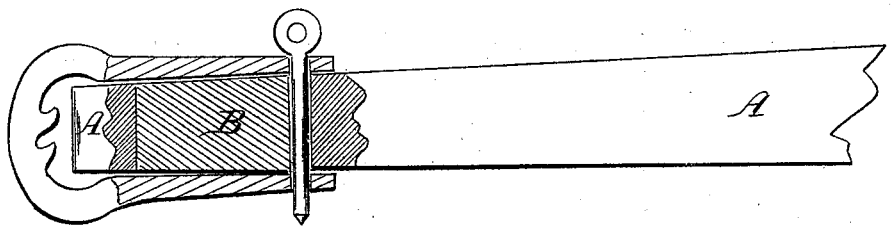
Figure 2:
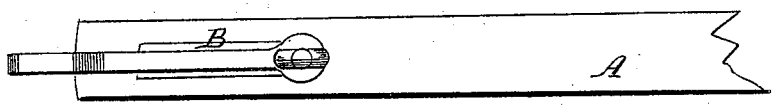

Figure 1 is a side view of the forward part of a plow-beam to which my improvement has been attached, partly in section to show the construction. Fig. 2 is a top view of the same.

Similar letters of reference indicate corresponding parts.

My invention has for its object to furnish an improvement in the construction of plow-beams, so as to diminish the shock when the plow strikes an obstruction, to prevent the plow from being broken or the team from being injured, and which shall be simple in construction, inexpensive, and readily applied; and it consists in the combination of a rubber block with the mortised forward end of the plow-beam to receive the draft of the clevis bolt or pin, as hereinafter more fully described.

A represents an ordinary plow-beam, through the forward part of which is formed a mortise four inches (more or less) in length, and extending from the clevis-bolt or pin-hole forward toward the forward end of the beam A. Into this mortise is fitted a block, B, of rubber or its equivalent, as shown in Figs. 1 and 2, and against the rear end of which the clevis pin or bolt rests, so that the draft may be sustained by the said rubber block B. By this construction, should the plow strike an obstruction, the rubber block B will give, and thus prevent the plow from being broken by the shock. The elasticity of the block B also prevents the horses from being injured by the sudden stopping of the plow, or by the jar or jerk in first starting the plow.

Having thus described my invention, I claim as new and desire to secure by Letters Patent—

The combination of a rubber block, B, or equivalent, with the mortised forward part of the plow-beam to sustain the draft of the clevis pin or bolt, substantially as herein shown and described, and for the purpose set forth.

JAMES L. BALDWIN.

Witnesses:
E. B. PARSONS,
WM. H. PECK.